UNITED STATES PATENT OFFICE 2,642,898

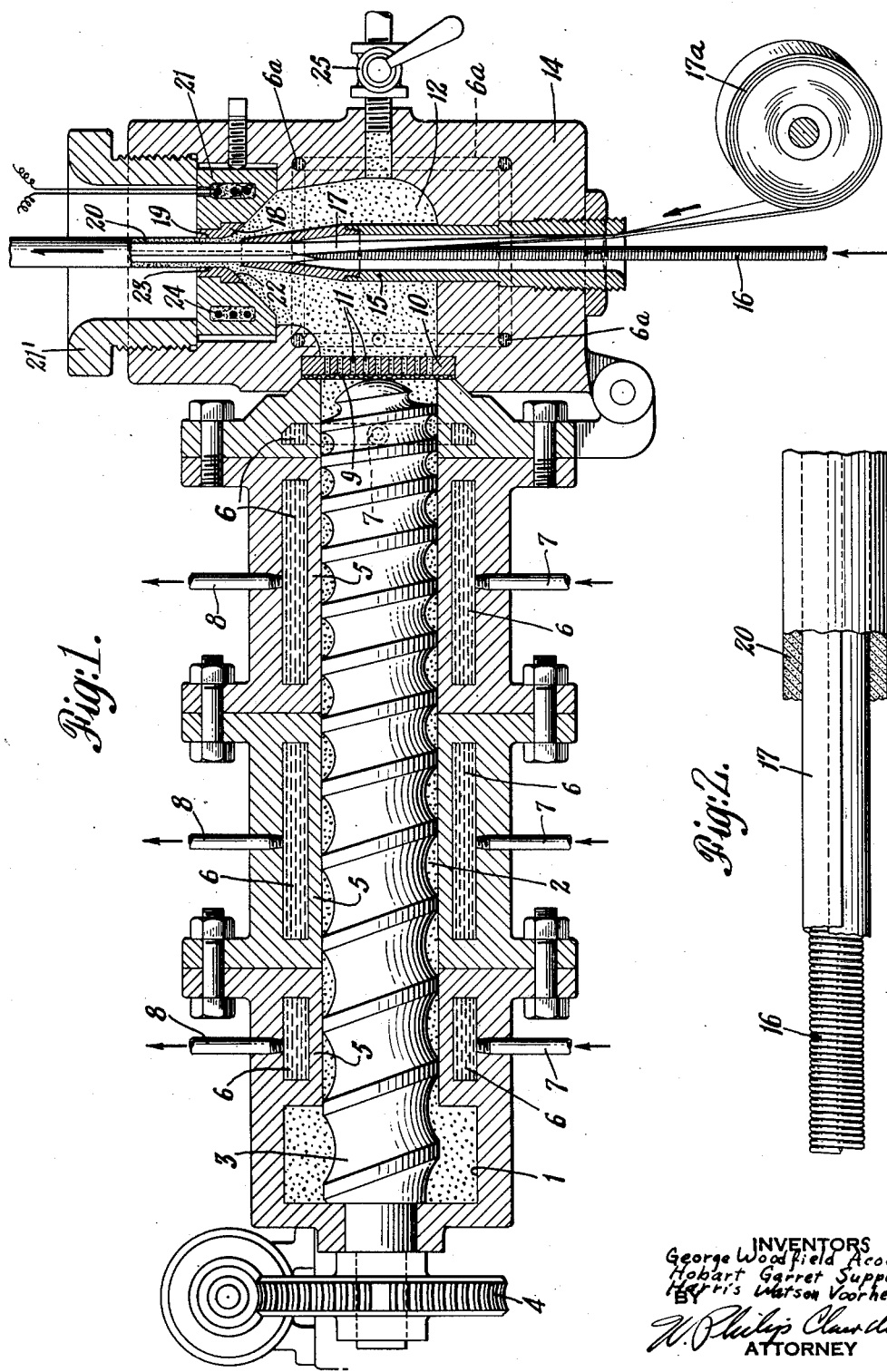

CONTROL CASING AND MANUFACTURE THEREOF

George Woodfield Acock, Hobart Garret Suppers, and Harris Watson Voorhees, Morrisville, Pa., assignors to John A. Roebling's Sons Company, Trenton, N. J., a corporation of New Jersey Application September 30, 1948, Serial No. 51,906

4 Claims. (Cl. 138—56)

This invention relates to a flexible covered control casing for use in the transmission of power or control, and to a method of preparing the same.

Control casing consists of a hollow, flexible wire helix in the shape of a long coil and is utilized as the housing of an inner control member for the flexible or indirect transmission of power or control by either reciprocating or rotating motion from one position to a remote position, such as for the operation of chokes, throttle controls, muffler cut-outs, ignitions, speedometers, brakes, power take-ups and the like.

Heretofore, in order to keep out dust, moisture and other foreign matters, the wire core of the control casing has been covered by a sheath of cotton braid, which is woven in place about the wire core, and then coated with one or more coats of lacquer applied to its exterior. The weaving of this cotton-braid covering and the application of lacquer coatings are slow and expensive processes, and frequent interruptions and stoppages are necessary.

The resulting sheath is not entirely satisfactory, for it is subject to fraying when the control casing is stripped for connection to terminals and also when the covered control casing has been subjected to abrasion through the vibratory contacts common in the fields of automotive, air and marine power installations, the primary uses for such control casing. Furthermore, only very slight abrasion oftentimes is sufficient to break the seal of the lacquer coating and thus permit the entry of moisture through the cotton braid to the casing and its inner control member, and also to permit the braided covering to absorb gasoline or oil fumes, thus becoming highly inflammable. Moreover, the internal use of common lubricants, such as oil or grease, has a detrimental action on the cotton-braid and lacquer coating and thus necessarily must be avoided.

An object of the invention is to provide a continuous high-speed method of manufacturing covered control casing.

A further object of the invention is to provide a covered control casing which has superior physical properties, particularly in regard to the deteriorating effect of exposure to heat, fire, water and petroleum products.

Another object of the invention is to provide a covered control casing having a covering which will not be subject to fraying either when in use or when the ends of the control casing are stripped of the covering for connection to terminals.

Another object of the invention is to provide a covered control casing which will stand a greater amount of shock and a greater degree of bending before the protective covering will break, and which will stand a greater amount of abrasion and wear before the protective seal of the covering will be destroyed.

A still further object of the invention is to provide an improved covered control casing which will permit internal lubrication of the control casing and control member by oil or other common lubricants without any deteriorating effect on the protective covering and without serious loss of the lubricant by absorption into the covering.

We have found that control casing of improved quality and physical properties can be made by covering the wire coil core with a layer of a relatively inexpensive thin sheet material and then extruding thereabout a continuous envelope or sheath of thermoplastic or thermosetting material. The method of our invention can be used to apply a superior protective covering to control casing at many times the speed of any method heretofore used in applying woven or braided coverings. It also provides for continuous operation of the complete covering process without any interruptions or stoppages being required in order to replenish the supply of covering materials.

The control casing thus made may have as an exterior covering a thermoplastic material or compound. Examples of such materials that are suitable include ethyl cellulose, polymerized vinyl chloride, vinyl chloride and vinyl acetate copolymers, polyamides and polyethylenes, together with thermosetting materials such as polychloroprene, polyisobutylene, and other rubber or rubber-like compositions. By the use of such a material, a covering for control casing may be obtained which is superior to a lacquered cotton-braid covering for a great many applications. It may be made more impervious to the effects of heat, fire, moisture and petroleum products and have greater weathering properties, such as resistance to sunlight, salt spray, sand and other elements. It may be made to withstand a greater degree of shock and bending before it will break. It will not fray through wear or when stripped for attachment to terminals. It can withstand internal lubrication of the control member by oil or grease without any deteriorating effect on the covering or serious loss of the lubricant by absorption in the covering. Furthermore, this new covering has greater powers of elongation, is easier to clean and has unlimited integral color possibilities which may be utilized for easy differentiation between the various control casing members found in some automotive, air or marine power installations.

Other objects, features and advantages of the invention will appear from a detailed description of an illustrative form of apparatus for making the new casing shown in the accompanying drawings, in which:

Figure 1 is a longitudinal sectional view of one form of a plastic extrusion machine that may be employed to manufacture covered control casing in accordance with our invention;

Figure 2 is an elevation view broken away to show a covered control casing embodying the invention including the control casing core, the separator layer and the extruded protective covering.

Referring now to the drawings, Figure 1 shows in longitudinal section a plastic extruding machine suitable for use in practicing our improved method for covering control casings embodied in the present invention. Although, as stated before, other suitable thermoplastic or thermosetting compounds can be used in this process, the invention will be described by way of example with reference to a covering plastic comprising a particular ethyl cellulose thermoplastic compound, commonly marketed under the name "Ethocel ER-S3," of which the following table lists several properties:

| | |
|---|---|
| Flow temperature, ° F | 270 |
| Extrusion temperature, ° F | 350 |
| Specific gravity | 1.16 |
| Tensile strength, p. s. i | About 4000 |
| Elongation, % | 65 |

A supply of said ethyl cellulose in dry, loose state is maintained in a hopper, not shown, and fed by gravity through aperture 1 into the preheat chamber 2 and through said chamber by means of the screw 3 driven by a worm and worm wheel 4 or other suitable means. Since the presence of undue moisture in ethyl cellulose causes a rough or blistered surface when the material is extruded, the ethyl cellulose should be dried before being introduced into the apparatus so that the ethyl cellulose will not contain more than about .01% moisture by weight. This drying can be accomplished in any suitable oven at a temperature at about 175° to 195° F. for about one hour immediately before use in this process.

In the pre-heat chamber 2, the plastic material is heated to its flow temperature, preferably 270° F. for this particular ethyl cellulose, so that it will have sufficient friction with reference to the cylinder walls 5 and slip on the screw 3 for optimum rate and uniformity of feed. Heat is supplied to this pre-heat chamber 2 by heating chambers 6 in the walls thereof through which heated oil may be circulated by means of inlet pipes 7 and outlet pipes 8, or by other suitable heating devices. The plastic material is fed by the operation of the stock screw or worm 3 against the screen 9 and breaker plate 10, the apertures 11 of which permit the viscous plastic to flow into the extrusion chamber 12 but retain any unmelted particles of plastic in the pre-heat chamber 2.

This extrusion chamber 12 is maintained at extrusion heat, preferably about 350° F. in the case of this particular ethyl cellulose, by oil circulating chambers 6a or other suitable heating means embedded in the walls 14 thereof. An adjustable core tube 15 projects into the extrusion chamber 12. The control casing core 16 is fed into the extrusion chamber through this core tube 15. As the wire core 16 passes through the core tube 15, it may be covered by a layer of separator material 17 which may be supplied from the roll 17a. The separator material may be any suitable type of paper or other thin sheet material, and is preferably applied to the core longitudinally so that it is wrapped around the core tightly with a slight overlap. Thus, as the core enters the extrusion chamber 12, it is already covered with its separator layer 17. The control casing core 16 preferably comprises a hollow, flexible, closely wound helix of round, square or otherwise shaped ferrous or non-ferrous wire which may be wound in either a right or left hand coil, as desired, in any ordinary wire coiling machine.

The separator 17 preferably comprises a strip of paper such as high grade rope paper or crepe paper and is applied longitudinally about the control casing core 16 with a slight overlap. A separator 17 comprising a paper strip of .004" thickness and ⅞" wide applied with a slight overlap has been found to be very satisfactory for the usual control casing of about .239" outside diameter. This separator 17 may be applied just ahead of the plastic covering by longitudinal folding in the core tube 15 or in any other suitable manner as long as it is applied prior to entry of the core into the extrusion chamber 12. The purpose of this separator layer 17 is to prevent the hot plastic material from being forced between the convolutions of the coiled wire core 16 and also to reinforce said coiled wire core 16 to minimize elongation. This reinforcement is highly desirable when applying a covering to a very flexible, easily extensible small diameter control casing. In some cases it may be advantageous to make the separator layer as a thin braid or wrap of fibrous material such as fibreglass yarn.

The core tube 15 is streamlined to present no angular impediment to the flow of the plastic to the die 18. The flexible casing core 16 covered by its separator layer 17 passes through the plastic contained in extrusion chamber 12, is coated with plastic, and having received its plastic coating 20, it passes out through aperture 19 in the die 18 held in the die holder 21, said covered flexible casing core being centered in aperture 19 by the core tube 15 on the inside of the chamber 12 and by any suitable external supporting and take-up means (not shown) independent of the extruding parts.

In the operation used to illustrate our invention, wherein a control casing core covered as described above is to receive a protective exterior covering of this particular ethyl cellulose material, it has been found very satisfactory to feed the control casing core with its separator through extrusion chamber 12 which is heated to about 350° F. at a speed of about 150 feet per minute, maintaining a constant supply of the plastic in the extrusion chamber 12 by proper operation of the feed screw 3 and by proper flow of the plastic through aperture 1.

The aperture 19 of die 18 may be of any diameter to give the desired thickness of extruded plastic covering 20, but for this particular ethyl cellulose material a thickness of about one-eighth the outside diameter of the covered control casing core has been found to be very satisfactory.

The inner face 22 of the die 18 is tapered from the aperture 19 to a larger area where the plastic enters the die, an angle of about 40° being suitable for this taper. This inner face 22 and the land 23 of the die 18 should be ground and polished so as to offer minimum resistance to the flow of the plastic. Normally there should be at least one-quarter of an inch of land 23 in the die aperture 19.

The die 18 is preferably heated separately from the extrusion chamber 12. Electrical resistance heating units 24 set in the die holder 21, and controlled by a rheostat with an indicating pyrometer, are very satisfactory. This enables the die 18 to be heated to a greater temperature than the extrusion chamber 12, permitting the surface of the extruded plastic covering 20 to be highly heated for a good finish while beneath the surface a cooler temperature may be retained for stiffness. The surface temperature of the plastic mass 20 as it comes from the die 18 should be somewhat above the temperature of the extrusion chamber 12, and for example may be from between 340° F. and 400° F. Set in the wall 14 of extrusion chamber 12 is a bleeder valve 25 which may be used to relieve any excessive pressures arising in the operation of the extrusion process.

All of the temperatures given herein apply to ethyl cellulose, Ethocel ER-S3, and will vary to some extent depending upon the grade of this material used. These temperatures may also vary if other materials are used but the principle remains the same throughout.

Figure 2 is a view of an improved covered control casing embodying our invention. This new control casing is made up of three elements, the internal core member comprising a hollow, flexible, tightly coiled wire helix 16, the separator layer 17 made of thin sheet material such as a fibrous covering, a high grade rope paper, a crepe paper or a cloth, and the outer covering 20 of an extruded thermoplastic or thermosetting compound.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

Having described our invention, we claim:

1. A control casing consisting of a hollow, flexible, extensible, longitudinal member, a separator layer of thin sheet material covering the outer surface of said member in slidable engagement therewith, and an outer layer consisting of a continuous envelope of extruded plastic material formed directly over said separator layer.

2. A control casing which consists essentially of a hollow, flexible, extensible tightly coiled wire helix, a separator layer of thin sheet material applied longitudinally about said helix in slidable engagement therewith, and a continuous envelope of plastic material extruded about the covered helix.

3. A control casing which consists essentially of a hollow, flexible, extensible, tightly coiled wire helix, a paper strip applied around said helix, and a continuous exterior sheathing of a cellulose plastic compound extruded in place about said covered helix.

4. The method of manufacturing covered control casing which comprises applying a paper strip longitudinally with a slight overlap around the outer surface of a hollow, flexible, extensible, tightly coiled wire helix, and extruding about said covered helix a continuous envelope of a predetermined thickness of a cellulose plastic compound.

GEORGE WOODFIELD ACOCK.
HOBART GARRET SUPPERS.
HARRIS WATSON VOORHEES.

References Cited in the file of this patent

UNITED STATES PATENTS

| Number | Name | Date |
|---|---|---|
| 284,050 | Nichols | Aug. 28, 1883 |
| 1,610,910 | Williams | Dec. 14, 1926 |
| 2,045,540 | Debenedetti | June 23, 1936 |
| 2,066,473 | Jorgenson | Jan. 5, 1937 |
| 2,097,501 | Reichett | Nov. 2, 1937 |
| 2,122,335 | Berman | June 28, 1938 |
| 2,146,559 | Berkowitz | Feb. 7, 1939 |
| 2,155,980 | Reichett | Apr. 25, 1939 |
| 2,171,764 | Ramsdell | Sept. 5, 1939 |
| 2,266,226 | Mall | Dec. 16, 1941 |
| 2,309,903 | Hume | Feb. 2, 1943 |

FOREIGN PATENTS

| Number | Country | Date |
|---|---|---|
| 36,741 | Denmark | Nov. 1, 1926 |

OTHER REFERENCES

Ser. No. 244,268, Zundorf (A. P. C.), published May 11, 1943.